(12) United States Patent
Sohn

(10) Patent No.: US 7,323,792 B2
(45) Date of Patent: Jan. 29, 2008

(54) WIND TURBINE

(76) Inventor: Chester Sohn, 4501 Holly La., NW. Gib Harbor, WA (US) 98335-1435

( * ) Notice: Subject to any disclaimer, the term of this patent is extended or adjusted under 35 U.S.C. 154(b) by 7 days.

(21) Appl. No.: 11/431,179

(22) Filed: May 9, 2006

(65) Prior Publication Data

US 2006/0251516 A1    Nov. 9, 2006

Related U.S. Application Data

(60) Provisional application No. 60/679,345, filed on May 9, 2005.

(51) Int. Cl.
*F03D 3/04* (2006.01)
(52) U.S. Cl. .................. 290/55; 290/44; 415/4.2; 416/197 A
(58) Field of Classification Search ............ 290/43, 290/44, 54, 55; 415/4.1, 4.2; 416/197 A, 416/128
See application file for complete search history.

(56) References Cited

U.S. PATENT DOCUMENTS

| | | | | |
|---|---|---|---|---|
| 4,140,433 A * | 2/1979 | Eckel | ................... | 415/209.1 |
| 5,009,569 A * | 4/1991 | Hector et al. | ................ | 415/4.1 |
| 5,336,933 A * | 8/1994 | Ernster | ................... | 290/55 |
| 5,591,004 A * | 1/1997 | Aylor | ................... | 416/42 |
| 5,599,168 A * | 2/1997 | Lund | ................... | 416/136 |
| 6,158,953 A * | 12/2000 | Lamont | ................... | 415/4.4 |
| 6,177,735 B1 * | 1/2001 | Chapman et al. | ............ | 290/44 |
| 6,249,059 B1 * | 6/2001 | Hosoda | ................ | 290/55 |
| 6,448,669 B1 * | 9/2002 | Elder | ................... | 290/54 |
| 6,929,671 B2 * | 8/2005 | Kim et al. | ................ | 55/385.1 |
| 6,984,899 B1 * | 1/2006 | Rice | ................... | 290/44 |
| 7,040,859 B2 * | 5/2006 | Kane | ................... | 415/4.2 |
| 7,230,348 B2 * | 6/2007 | Poole | ................... | 290/55 |
| 2003/0006614 A1 * | 1/2003 | Kari | ................... | 290/55 |

* cited by examiner

*Primary Examiner*—Nicholas Ponomarenko
(74) *Attorney, Agent, or Firm*—Raymond Y. Chan; David and Raymond Patent Group

(57) ABSTRACT

A wind turbine including an open hub, foldable blades attached to the rim of the hub, and a mechanism for tilting the turbine is disclosed.

25 Claims, 16 Drawing Sheets

WIND TURBINE

CROSS REFERENCE OF RELATED APPLICATION

This application is a non-provisional application of a provision application having an application No. of 60/679,345, and a filing date of May 9, 2005.

BACKGROUND OF THE PRESENT INVENTION

1. Field of Invention

The present invention relates to a turbine, and more particularly to a wind turbine comprising a rotor hub which has a peripheral guiding rim adapted for guiding a flow of air to a plurality of blades so as to maximize an efficiency of the wind turbine.

2. Description of Related Arts

Wind is the movement of air, which has mass, and when air is in motion it contains kinetic energy. A wind energy system converts the kinetic energy of wind into mechanical or electrical energy that can be harnessed for practical use. Mechanical energy harnessed by windmills, for example, can be used for tasks such as pumping water for a well.

Wind energy systems which harness electrical energy are generally referred to as wind turbines. As air flows past the rotor of a wind turbine, the rotor spins and drives the shaft of an electrical generator to produce electricity. The electricity generated by a wind turbine can be collected and fed into utility power lines, where it is mixed with electricity from other power plants and delivered to utility customers.

The output of a wind turbine depends on a number of factors, including the turbine's size and design, the speed of wind passing through the rotor, and the amount of time that wind is available. The energy that wind contains is a function of the cube of its speed. This means that a site with 12-mph average winds has more than 70% more energy than a site with 10-mph average winds.

Wind turbines generally consist of blades that rotate around a hub, which most commonly revolves around a horizontal axis. The hub is connected to a drive train, which transfers energy to a generator, often via a gearbox. The drive train and gear box are typically located inside a nacelle or housing, which is generally mounted at the top of a tower.

A major problem for this kind of conventional wind turbine is that when air flows through the turbine, a substantial portion of which will be bounced back by the hub. As a result, that portion does not contribute to the rotational movement of the turbine. At a given time, much energy which is carried by wind will be lost simply by it not being properly collected. What is worse is that if the energy carried by that portion of wind which impinges on the turbine but is not properly converted into kinetic energy of the hub and the blade, the excess energy will actually cause air drag and retard the rotational movement of the wind turbine, thereby significantly reducing an efficiency thereof.

SUMMARY OF THE PRESENT INVENTION

A main object of the present invention is to provide a wind turbine which comprises a rotor hub having a peripheral guiding rim adapted for guiding a flow of air to a plurality of blades for maximizing an efficiency of the wind turbine.

Another object of the present invention is to provide a wind turbine, wherein the rotor hub has an air passageway for allowing air to pass therethrough, so as minimize the air drag affecting the wind turbine, and enhance the efficiency thereof.

Another object of the present invention is to provide a wind turbine, wherein each of the plurality of blades is shaped and sized to facilitate guiding of air flow from the hub to the blade, so as to maximize the amount of air flow which can be guided from the hub to the blade for maximizing conversion of the wind's kinetic energy to the blades' rotational power.

Another object of the present invention is to provide a wind turbine which can be utilized in a wide variety of circumstances so as to facilitate widespread application of the present invention.

Accordingly, in order to accomplish the above objects, the present invention provides a wind turbine for a power generator, comprising:

a rotor hub adapted for rotatably coupling with the power generator to generate a rotation power thereto, wherein the rotor hub has a peripheral guiding rim and an air passageway formed within the guiding rim for allowing an axial flow of air passing through the air passageway of the rotor hub; and a plurality of blades outwardly and spacedly extended from the guiding rim of the rotor hub, wherein each of the blades has a blade surface arranged in such a manner that when the air flow exerts on the blade surfaces of the blades, the rotor hub is driven to rotate for generating the rotational power to the power generator, wherein the rotor hub allows the air flow passing through the air passageway to minimize an air drag thereof so as to enhance an efficiency of the rotational power generated by the rotor hub.

These and other objectives, features, and advantages of the present invention will become apparent from the following detailed description, the accompanying drawings, and the appended claims.

Figure 1:
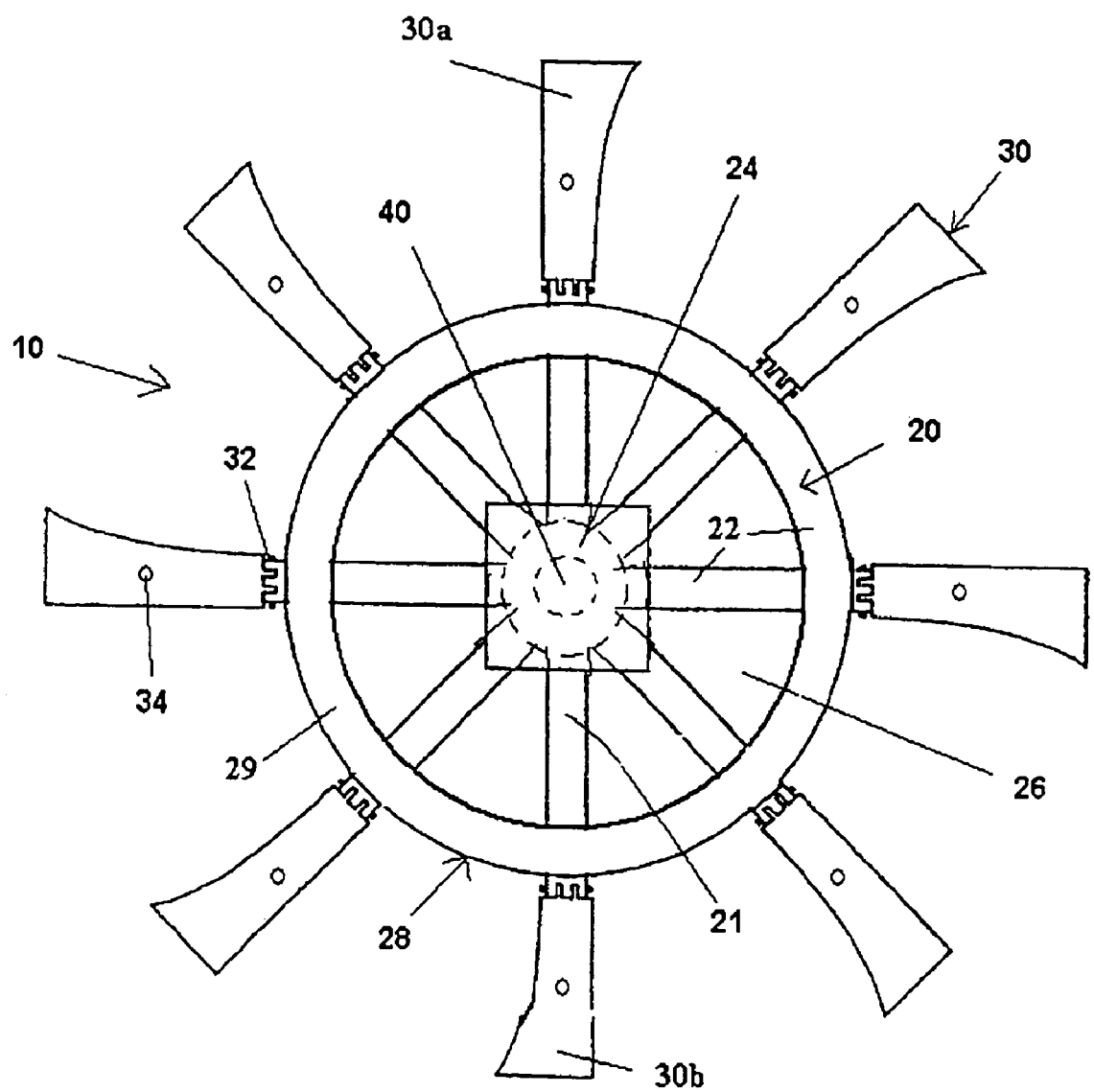
FIG. 1 is a front elevational view of a rotor of a wind turbine according to a preferred embodiment of the present invention.

All dimensions specified in this disclosure are by way of example only and are not intended to be limiting. Further, the proportions shown in these Figures are not necessarily to scale. As will be understood by those with skill in the art with reference to this disclosure, the actual dimensions of any device or part of a device disclosed in this disclosure will be determined by their intended use.

DETAILED DESCRIPTION OF THE PREFERRED EMBODIMENT

The present application relates to a wind turbine having improved features which allow it to generate power more economically than presently known wind turbines. The present turbine includes a rotor hub of increased diameter compared to current turbine rotor hubs, allowing wider blades to be attached to the hub. Such a hub also facilitates connecting the blades of the turbine via a hinged connection, which allows the blades to be retracted in a controlled fashion in order to regulate the rotational speed of the rotor and to protect the blades. This feature in particular is useful during extreme operating conditions such as high wind, dust storms, and hail storms. In addition, the shaft and rotor of the assembly are provided with a pivoting mechanism, allowing the assembly to assume an altered pitch in order to regulate the rotational speed of the rotor.

Definitions

As used herein, the following terms and variations thereof have the meanings given below, unless a different meaning is clearly intended by the context in which such term is used.

"Attachment" refers to a mechanical element that fastens parts of a device together. Attachments can be rigid or can allow for movement of the attached part, such as a hinge.

"Cable" refers to a length of flexible material for connecting one member of a device to another. Cables can be made from any of a number of materials, including metal, plastic, and fiber (e.g., rope). Cables can also be of varying cross-sectional dimension, such as generally circular (ropes and wire cables) or rectangular (belts).

"Hub" refers to the central part of a rotor to which a shaft and blades are connected. Hubs can include spokes or other supports which connect a central portion of the hub attached to the shaft with the rim of the hub.

"Mechanical communication" refers to a connection between components of a device which allows the transfer of movement, such as rotational movement, from one component to another.

"Nacelle" refers to a protective enclosure for covering equipment such as a shaft gears, and/or generators.

"Rim" refers to the outer part of the rotor hub, in particular the area between the outer circumference of the hub and the openings in the hub that are closest to the outer circumference of the hub. The outer circumference of the hub is the portion of the hub which is furthest from the central portion of the hub attached to the shaft and which provides mechanical support to the blades. The rim comprises the outermost point of attachment of the hub and the blades of the rotor.

"Rotor" refers to the blade and hub assembly of a wind turbine.

"Shaft" refers to a rigid member for transferring rotational energy from the rotor to one or more generators.

"V-belt pulley" refers to a pulley of variable pitch diameter.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Referring to FIG. 1, FIG. 2, FIG. 5A, FIG. 5B, FIG. 6, FIG. 7 FIG. 9 and FIG. 10 of the drawings, the wind turbine of the present invention comprises a rotor 10, a shaft 40, and a nacelle 50 for housing the shaft 40 and other turbine components. The rotor 10 comprises a hub 20 and blades 30. In conventional wind turbines, hubs are of small diameter, generally not much wider than the shafts to which they are attached, and are solid, i.e. do not include holes or passages allowing air to pass from the front face to a rear face of the hub. The small diameter of such hubs provides only a limited surface area to which blades can be attached, thus reducing the number of blades on a wind turbine as well as limiting the width of such blades. The hubs 20 of the present wind turbine, however, are preferably of greater diameter, allowing a larger number of blades 30 to be used to collect wind energy. In order to reduce drag on the hub 20, passages 26 between the front face 22 and rear face 21 of the hub 20 allow the passage of air through the hub 20.

In order to provide more blades 30 to be attached to the hub 20, the present hubs 20 are preferably greater than about 10 feet in diameter (with hubs which are not of generally circular cross-section, diameter is determined by the circular area swept by the portion of the hub furthest from the center when the hub is rotated), and more preferably are greater than about 20 feet in diameter. Hubs of such diameters do not detract from the ability of the turbine to capture wind energy because the area comprising the first 3 to 4 feet in diameter of the hub do not collect an appreciable amount of wind energy. It is believed that only beyond a diameter of about 10 feet is significant wind energy absorbed by the blades. In addition, longer blades tend to experience greater harmonic vibrations, which are detrimental to the function of a wind turbine, and it is further believed that most wind energy is captured at the ends of the blades 30. Therefore, the use of hubs 20 of greater diameter allows the use of shorter blades 30. The hubs 20 can be made from aluminum, steel, a composite material, or any other material known to the art for constructing hubs.

In the embodiment shown in FIG. 1, the hub 20 comprises a plurality of spokes 21 connecting the central portion 24 of the hub 20 with the rim 28. The rim 28 in this embodiment can comprise a circular member 29 to which the spokes 21 are attached. The hub 20 includes a plurality of openings 26, which in this embodiment comprise the open space between each of the spokes 21. The openings 26 allow the passage of air through the hub 20, i.e., such that the front face 22 of the hub 20 is in communication with the rear face 21, shown in FIG. 2. In an alternative embodiment, shown in FIG. 3, the rim 28 can comprise a serious of flanges 23 extending from each spoke 21 to an adjacent spoke 21.

Figure 2:
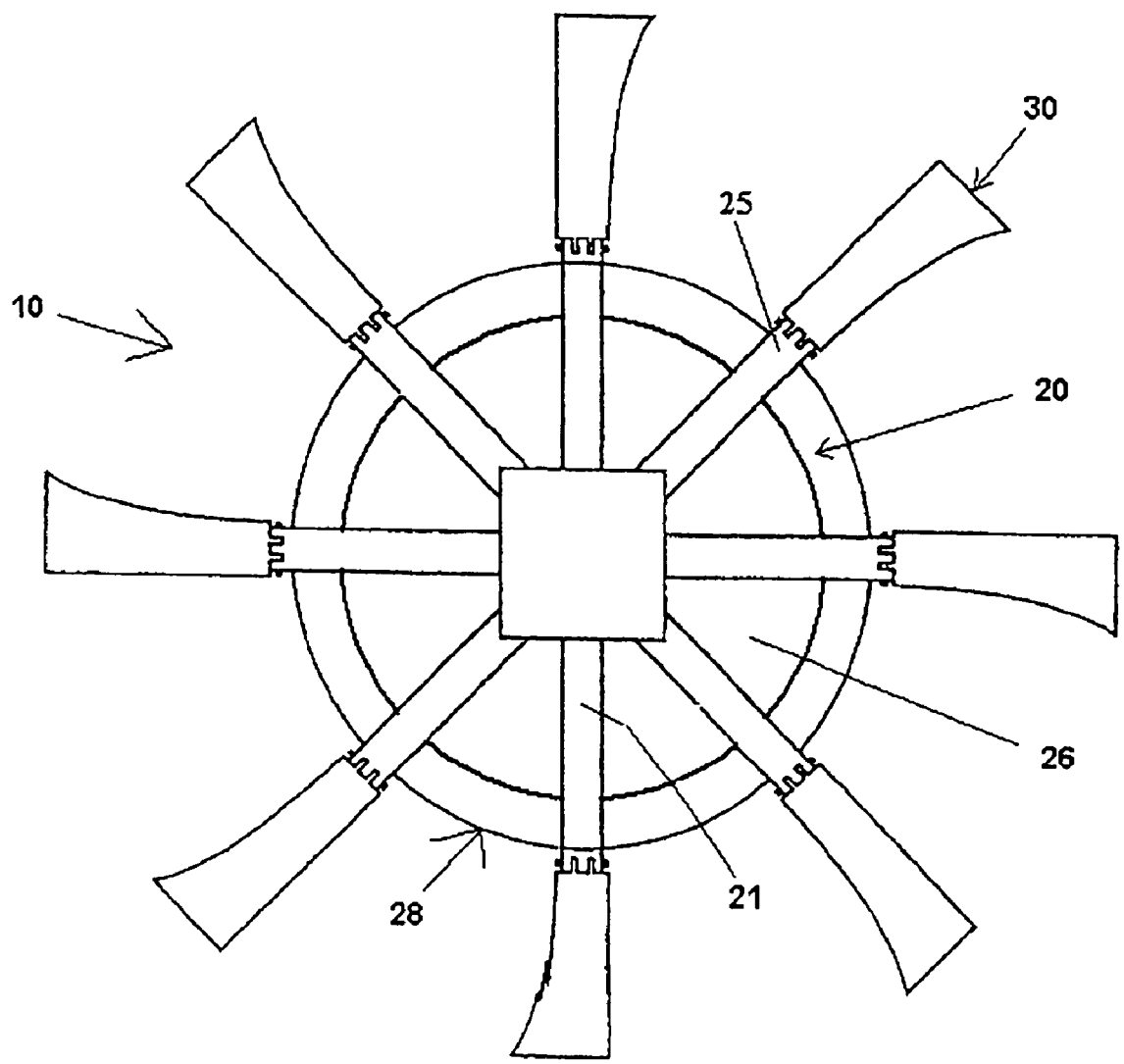
FIG. 2 is a rear elevational view of the rotor of the wind turbine according to the above preferred embodiment of the present invention.
Figure 3:
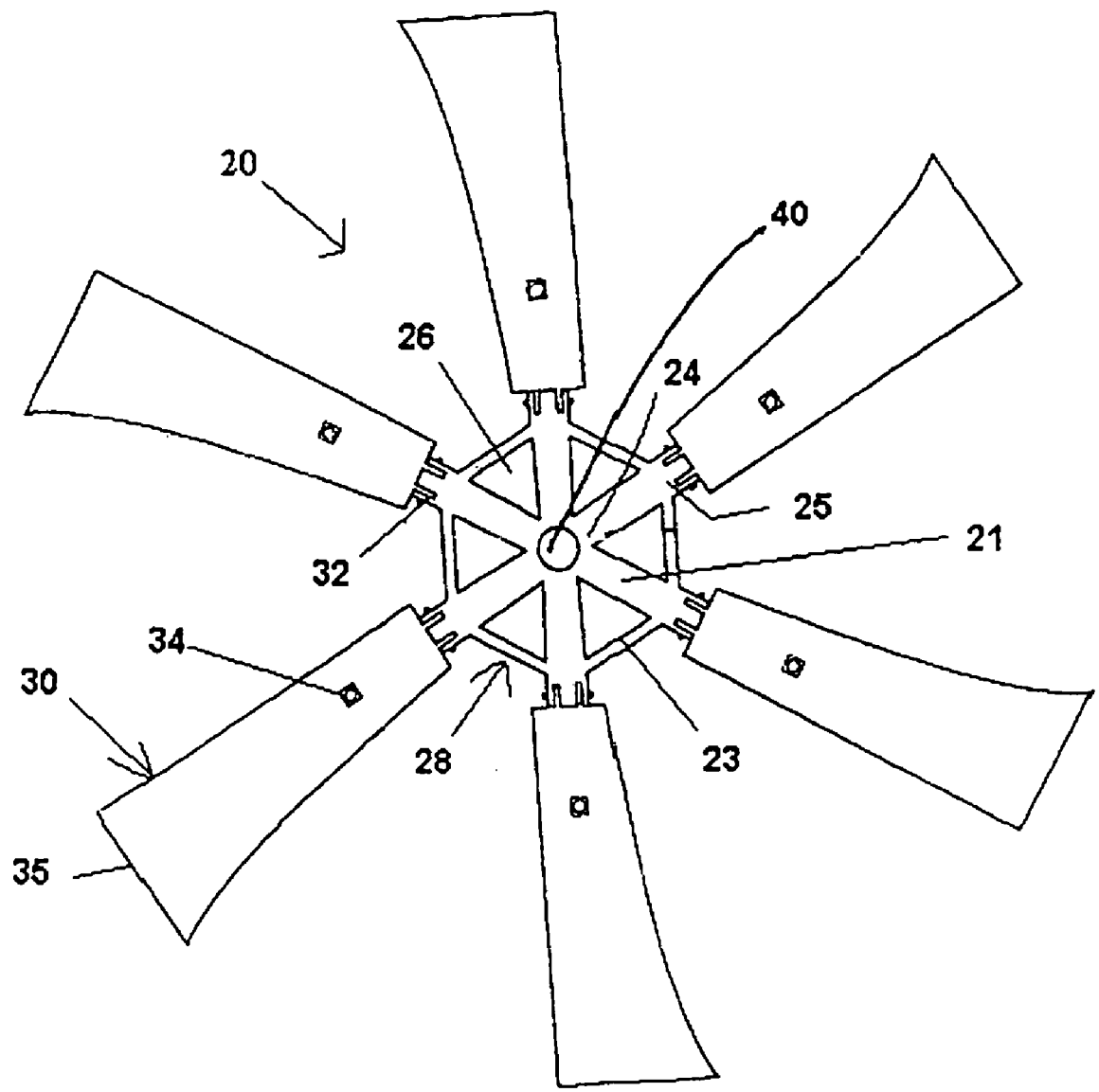
FIG. 3 is a front elevational view of an alternative embodiment of a rotor for the present wind turbine.
Figure 4:
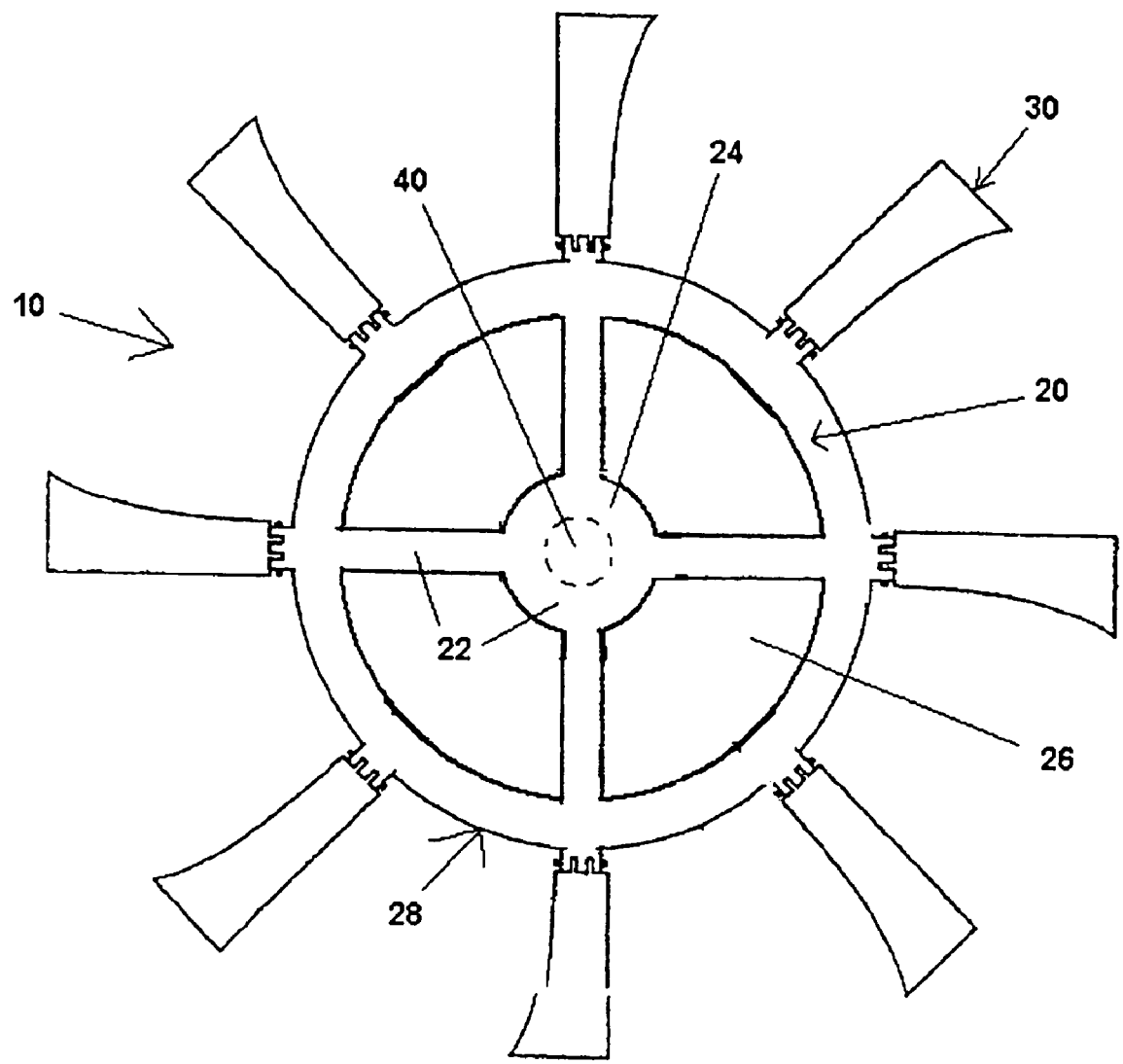
FIG. 4 is a front elevational view of yet another alternative rotor for the present wind turbine.

In a further alternative embodiment, shown in FIG. 4, the rotor 10 comprises a hub 20 having a face 22 extending outward from a central portion 24 which is connected to the shaft 40 of the turbine. The face 22 of the rotor hub 20 further includes a plurality of openings 26 which allow the passage of air through the hub 20, i.e., such that the front face 22 of the hub 20 is in communication with the rear face 21 of the hub 20 via the openings 26. The periphery of the hub 20 constitutes a rim 28 to which the blades 30 are preferably attached. In the embodiments of FIGS. 1-3, the blades 30 are attached at a distal end 25 of each of the spokes 21. However, as shown in FIG. 4, in other embodiments the blades 30 can be attached directly to a circumferential portion of the rim 28 rather than to a distal end 25 of a spoke 21.

The blades 30 used in the present wind turbine are preferably shorter than those conventionally used in power generating wind turbines today, which can be 120 feet in length. As mentioned above, the blades of the present wind turbine can be shorter in part due to the greater diameter of the hub 20 of the present wind turbine. The blades 30 of the present wind turbine, in one embodiment, are about 12 feet in length, though longer or shorter blades are also possible. For example, blades of only 3 to 4 feet in length are useful in some embodiments, while longer blades, such as blades of about 18 feet in length, can also be useful. When an appropriate amount of wind energy can be obtained with shorter blades, shorter blades are preferred, as fewer problems with harmonics tend to be experienced with shorter blades compared with longer blades. The harmonics of acoustic waves passing through the material of a blade during use can lead to fatigue and failure of the blade. The blades 30 can be made from materials known to the art for constructing blades, such as aluminum, steel, or composite materials such as fiberglass-reinforced polyester and wood-epoxy. The blades 30 are preferably attached to the hub 20 at an angle with respect to the front face 22 of the hub 20, with angles between about five degrees and about ten degrees being preferred.

Figure 10:
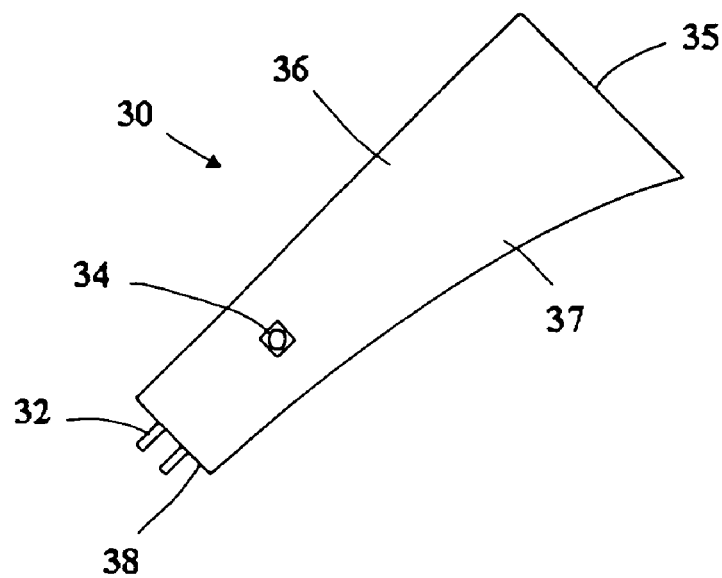
FIG. 10 is a top plan view of a blade for use in the present wind turbine.
Figure 11:
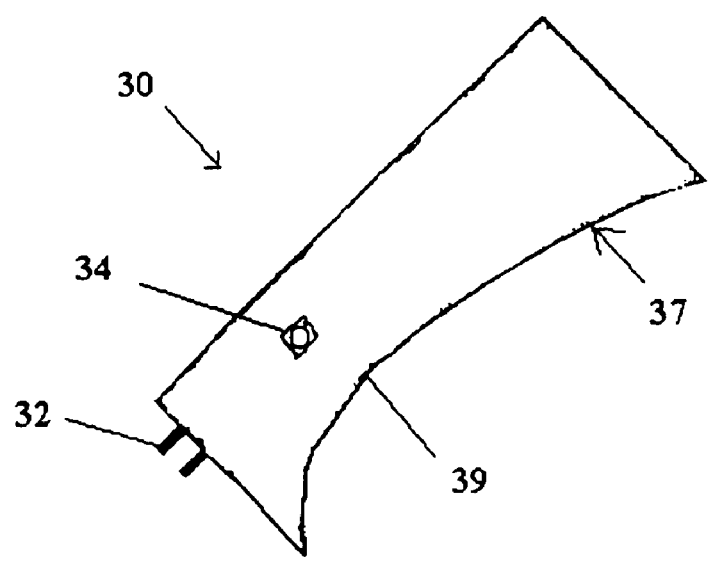
FIG. 11 is a top plan view of another blade for use with the present wind turbine.

The blades 30 used in the present wind turbine preferably comprise a leading edge 36 that is curved in order to reduce turbulence when it slices into the air as it rotates. As shown in FIG. 10, the trailing edge 37 of the blade 30 preferably includes a taper, i.e., the distal end 35 of the blade 30 is preferably wider than the central portion 39 and the proximal end 38. The radius of curvature of the distal end 35 of the blade 30 is also preferably smaller than that of the central portion 39 or the proximal end 38. In an alternative embodiment shown in FIG. 11, the proximal end 38 can also preferably be tapered such that it is wider than the central portion 39, and can include a radius of curvature that is smaller than that of the central portion 39. Such tapering of the trailing edge 37 also acts to reduce turbulence.

The blades 30 of the present wind turbine are preferably hingedly connected to the hub 20, such as via hinges 32 shown in FIGS. 1-5. Such a hinged attachment allows the blades 30 to be retracted in order to regulate the rotational speed of the rotor 10 and shaft 40. Such retraction can be accomplished either while the rotor 10 is stopped or, advantageously, while it is rotating. One of skill in the art will appreciate that the speed of the rotor 10 can be decreased, such as in high wind conditions, by pivoting one or more of the blades 30 about the hinges 32 and thereby changing the angle at which oncoming wind contacts the blades 30. Retraction of the blades 30 can also serve to protect the blades 30 during harsh weather conditions. The blades 30 are preferably pivoted in unison in order to maintain the balance of the rotor 10 while the blades 30 are being retracted. If a subset of blades is retracted, such a subset should comprise sets of at least two blades positioned equidistant from one another around the outer periphery of the rim 28, such as blades 30a and 30b in FIG. 1.

Figure 5A:
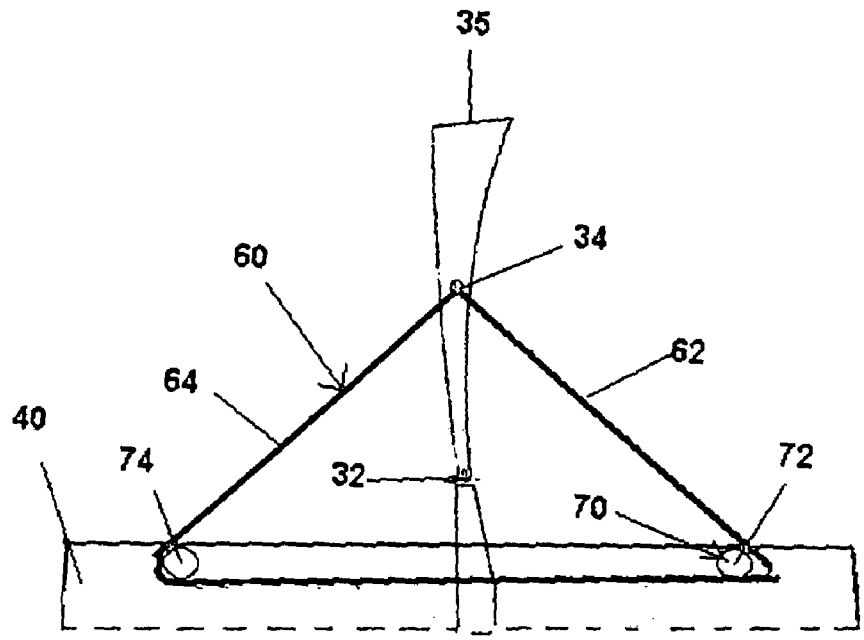
FIG. 5A is cutaway top plan view of the present wind turbine showing a mechanism for extending the blade, with the blade in the fully extended position.
Figure 5B:
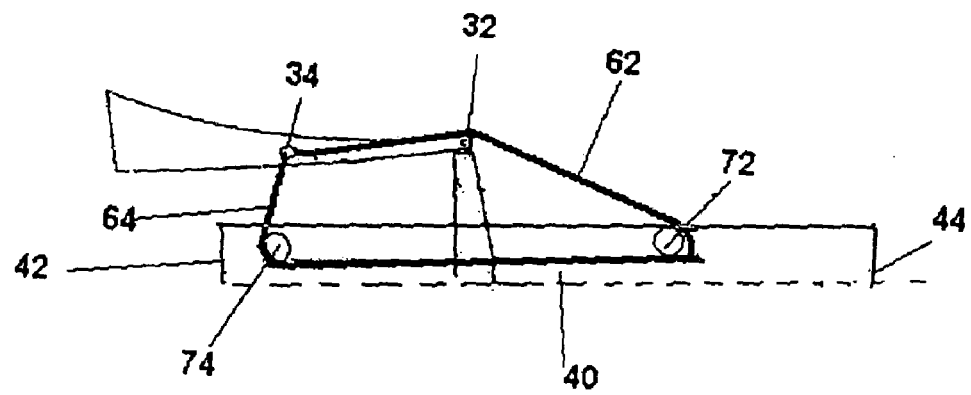
FIG. 5B is a cutaway top plan view of the present wind turbine showing the mechanism of FIG. 5A when blade is retracted.

The blades 30 are preferably actuated at hinges 32 so as to bend the blade with respect to the longitudinal dimension of the shaft 40. In the embodiment shown in FIGS. 5A and 5B, the blade 30 includes an anchor point 34 for securely attaching cables 60, which in one embodiment can be an eye bolt. The cables 60 are in mechanical communication with pulleys 70 or other mechanisms secured to the shaft 40 for changing the lengths of the cables 60 and thereby extending or retracting the blades 30. The cable 62 shown in FIGS. 5A and 5B is in mechanical communication with pulley 72, and the cable 64 is in mechanical communication with the pulley 74. These cables maintain tension between the blade 30 and the pulleys 70 in order to maintain the blades in a desired position, i.e. a desired angle with respect to the shaft.

As can be seen in FIG. 5B, when cable 62 is lengthened with respect to cable 64, the blades 30 are retracted such that the tips 35 of the blades 30 bend toward a distal end 42 of the shaft 40. The blades 30 can alternatively be retracted such that the blade tips 35 bend toward a proximal end 44 of the shaft 40. The pulleys 70 can be actuated by a motor, such as a 24 volt motor in order to retract the blades 30. Cable 62 preferably fits over a groove or pulley located at the hinge 32 when the blade 30 is in the retracted position, as shown in FIG. 5B. Alternatively, the blades can be retracted with a linear actuator or with a hydraulic mechanism, such as a hydraulic ram pump.

Figure 6:
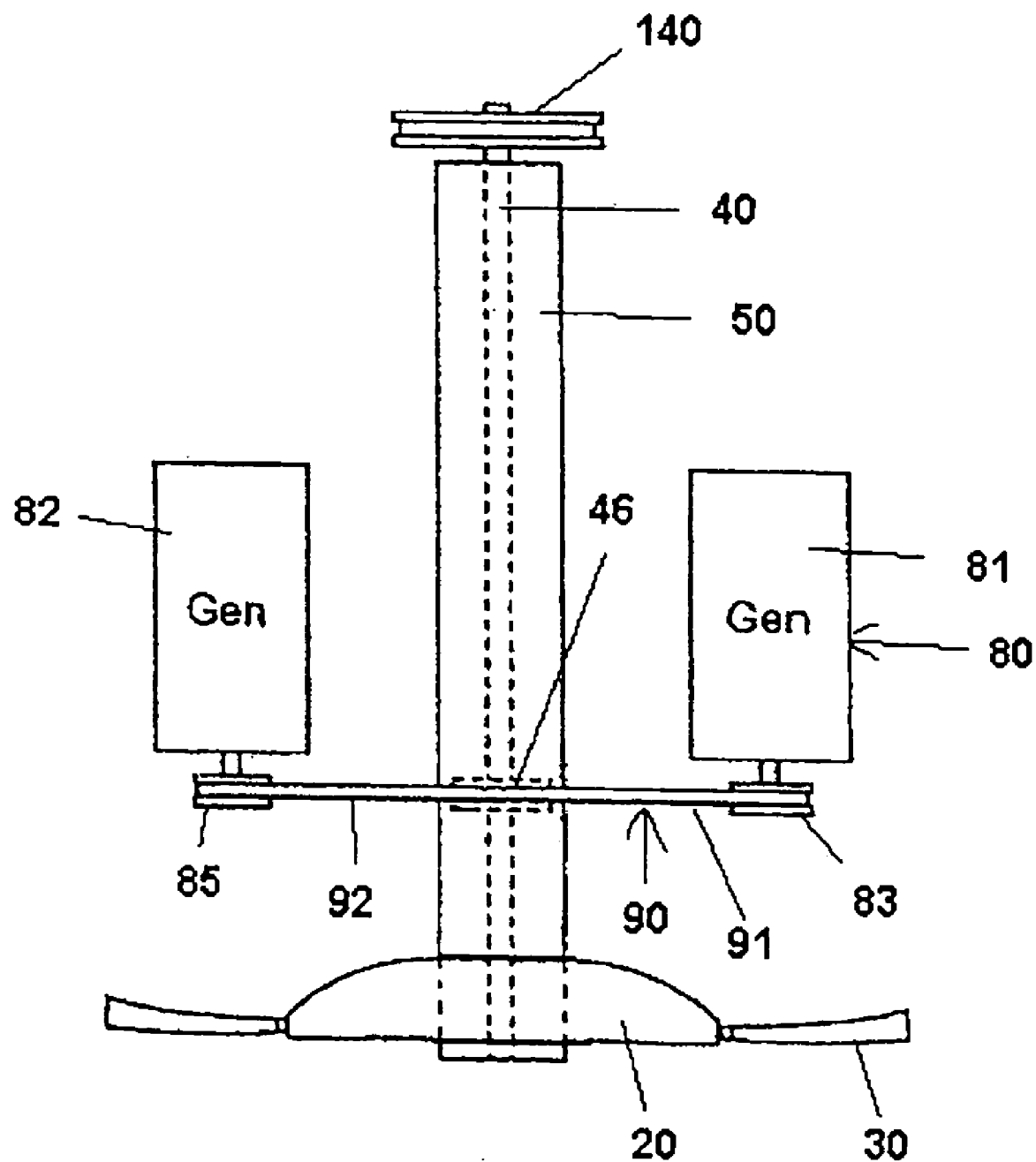
FIG. 6 is a partial top plan view illustrating an embodiment of the wind turbine of the present invention.

FIG. 6 illustrates the transfer of rotational energy captured by the rotor 10 to a generator 80. The generator in the present turbine is preferably a 6-pole (1200 revolutions per minute, rpm) or 8-pole (900 rpm) generator, though 4-pole (1800 rpm) and other generator types are also possible, although variable speed generators can also be used. The generator can produce either alternating current or direct current, depending on the use to which the energy generated is put. Alternating current can be fed into standard power lines, while direct current can be use to operate equipment on site, such as hydrogen generating equipment.

In the embodiment of FIG. 6, the shaft 40 is connected to one or more generators 80 via a pulley 46, to which are attached to belts or cables 90. The belts 90 are in turn attached to generators 80, such that the rotational energy of the shaft 40 is transferred to the generators 80 by the belts 90. In the embodiment of FIG. 6, the belts 90 directly connect the shaft 40 to the generators 80, i.e. a belt 91 connects the pulley 46 to a pulley 83 of generator 81, and a belt 92 connects the pulley 46 to a pulley 85 of generator 82. When belts (or gears) are used to directly transfer rotational energy to a generator, the rotor 10 and shaft 40 preferably rotate at relatively constant speeds, such between approximately 10 and 30 revolutions per minute, wind allowing.

Figure 7:
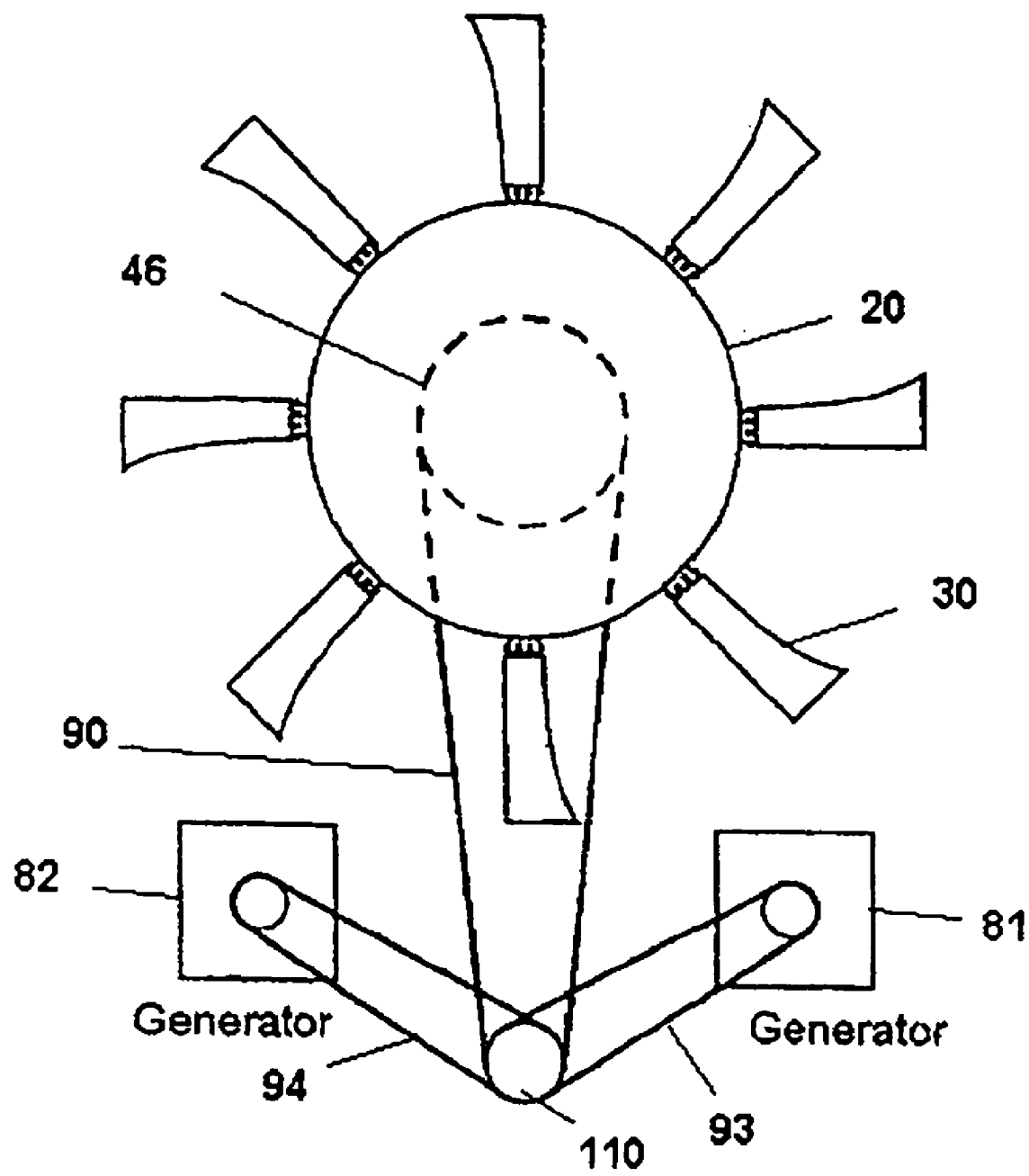
FIG. 7 is a front elevational view of one embodiment of the present wind turbine illustrating the transfer of rotational energy from a rotor to two generators.

In an alternative embodiment, shown in FIG. 7, the shaft 40 and pulley 46 are connected via a belt 90 to a V-belt pulley 110. The V-belt pulley is in turn connected via belts 93 and 94 to generators 81 and 82, respectively. The V-belt pulley acts to translate varying rotor and shaft speeds, produced by varying wind conditions, into a relatively constant output speed to the belts linking the V-belt pulley with the generators 80. Rotor speeds of between about 120 and 200 rpm are advantageous.

Figure 8:
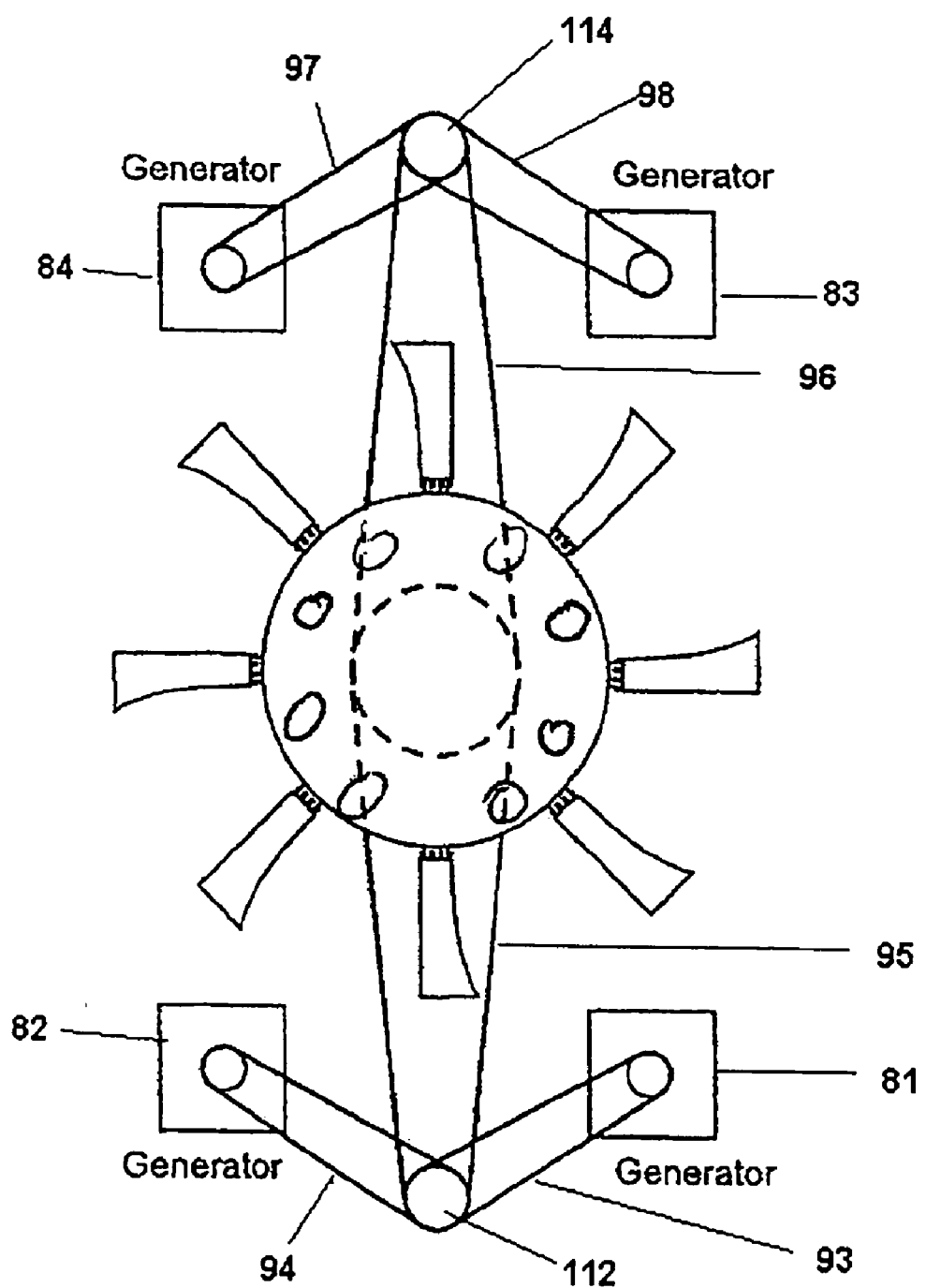
FIG. 8 is a front elevational view of an alternative embodiment of the present wind turbine illustrating the transfer of rotational energy from a rotor to four generators.

A further alternative is illustrated in FIG. 8, in which belts 95 and 96 are connected to V-belt pulleys 112 and 114, respectively. In this embodiment, belts 93 and 94 transfer rotational energy from V-belt pulley 112 to generators 81 and 82. Likewise, belts 97 and 98 transfer rotational energy from V-belt pulley 114 to generators 83 and 84, respectively. Of course, other mechanisms for transferring rotational energy from the shaft 40 to a generator 80 can be used in the present wind turbine. For example, gears, which are conventionally used in wind turbines, can be used instead of pulleys and belts.

The present wind turbine can be conventionally mounted on a tower, as is known to the art. Towers are conventionally cylindrical and made of steel, though lattice towers are also used, and generally range from 25 to 75 meters in height. The turbine can be mounted on a ring gear attached to the top of a tower in order to allow the turbine to rotate horizontally, and a yaw mechanism can also be included to turn the turbine so that it faces the wind. Other components known to the art for use with wind turbines can also be included in the present wind turbine. For example, disc brakes 140 (shown in FIG. 6) can be included in order to control the speed of the shaft 40, such as during high wind conditions.

In a preferred embodiment, the present wind turbine is also able to pivot with respect to the horizontal axis of the turbine and/or with respect to the vertical axis of the tower. Pivoting changes the pitch of the blades 30, i.e. the angle at which the blades contact the wind, allowing the amount of wind power being transferred to the blades 30 to be reduced. This protects the turbine in high wind conditions, as the energy transferred to the blades 30 by the wind can be reduced by tilting the blades 30. Tilting the shaft 40 and rotor 10 can also facilitate control over the rotational speed of the rotor 10 and/or of a generator with which the shaft 40 is in mechanical communication. The rotor 10 and shaft 40 can preferably be tilted by an angle of between about 25 degrees and 40 degrees, with angles of greater than 40 degrees being unpreferred.

Figure 9:
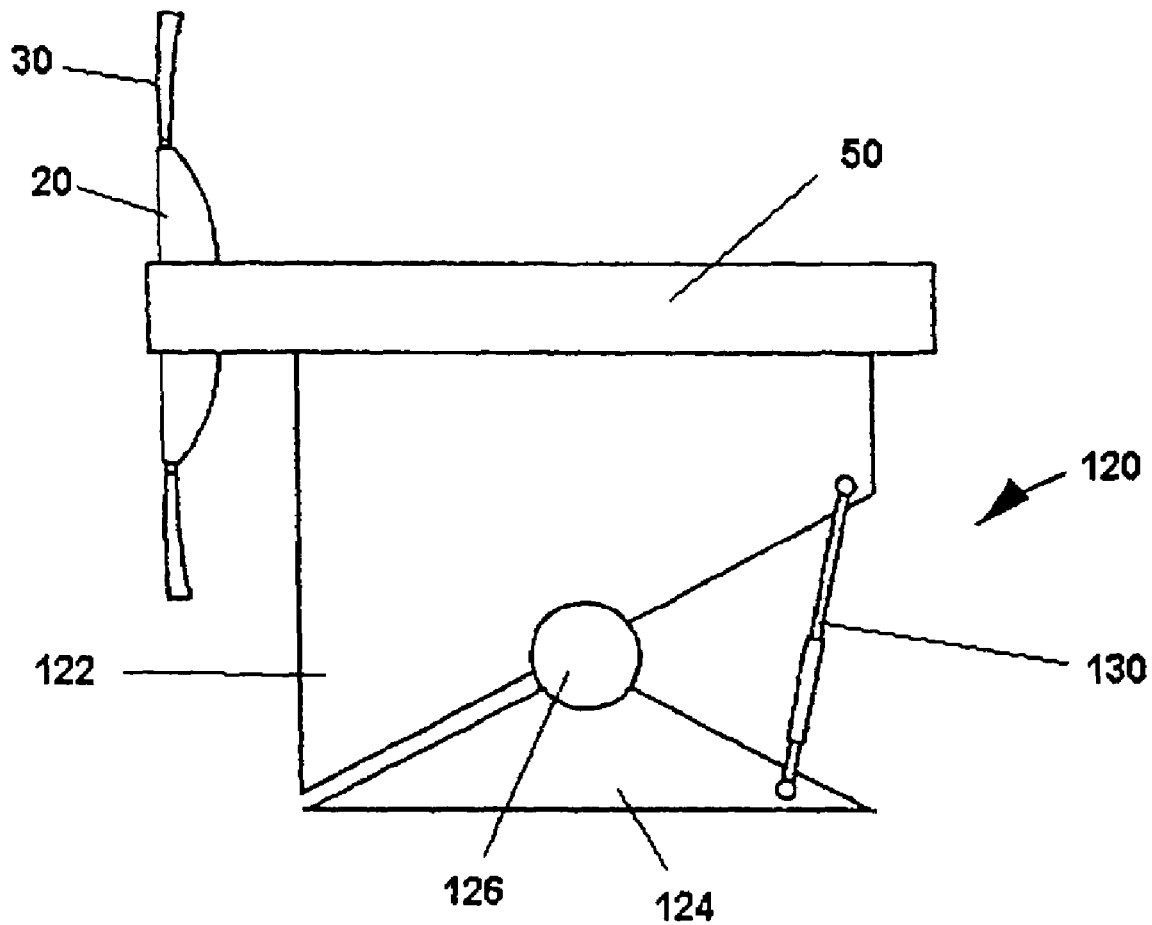
FIG. 9 is a side elevational view of a mechanism for tilting the shaft and rotor of the present wind turbine.

In one embodiment, shown in FIG. 9, the nacelle 50 is mounted on a platform 122 of pivot assembly 120. The platform 122 is connected to a base 124 via pivot 126, which can be a bearing. The pitch of the horizontal axis of the platform 122 and hence of the rotor 20, shaft 40, and nacelle 50 is controlled through a lift 130, which in the illustrated embodiment is a hydraulic lift. The horizontal angle of the platform 122 with respect to the ground can thus be changed by actuating a piston in the lift 130, i.e. by filling a cylinder containing the piston with a fluid (either liquid or gaseous), or can be changed in the opposite direction by reducing pressure in the cylinder, such as with a bleed valve. The hydraulic pump can advantageously be a hydraulic ram pump. Other mechanisms, such as a linear actuator, can also be used as the lift 130.

Figure 12:
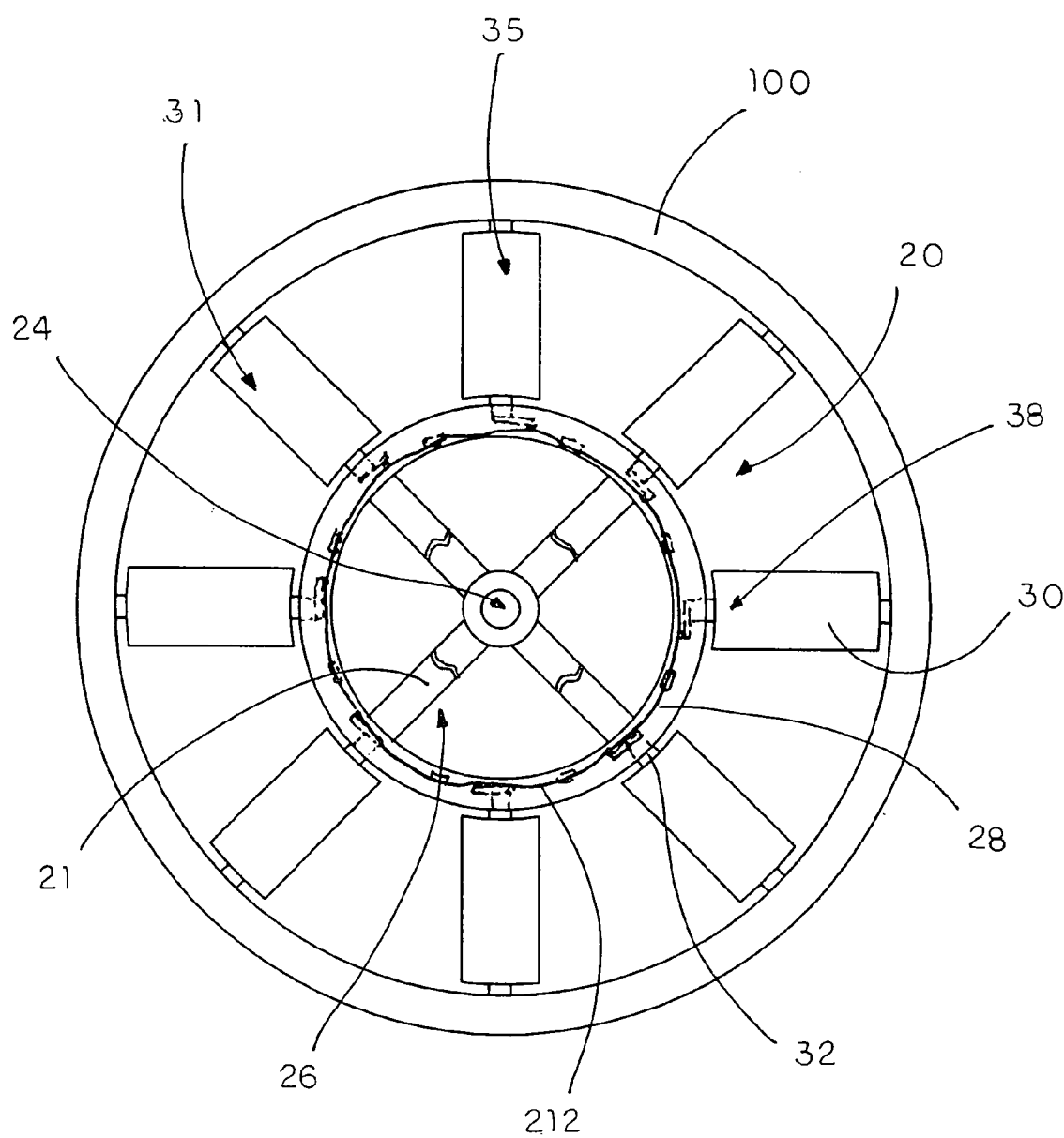
FIG. 12 is a schematic view of the wind turbine according to the above preferred embodiment of the present invention.
Figure 13:
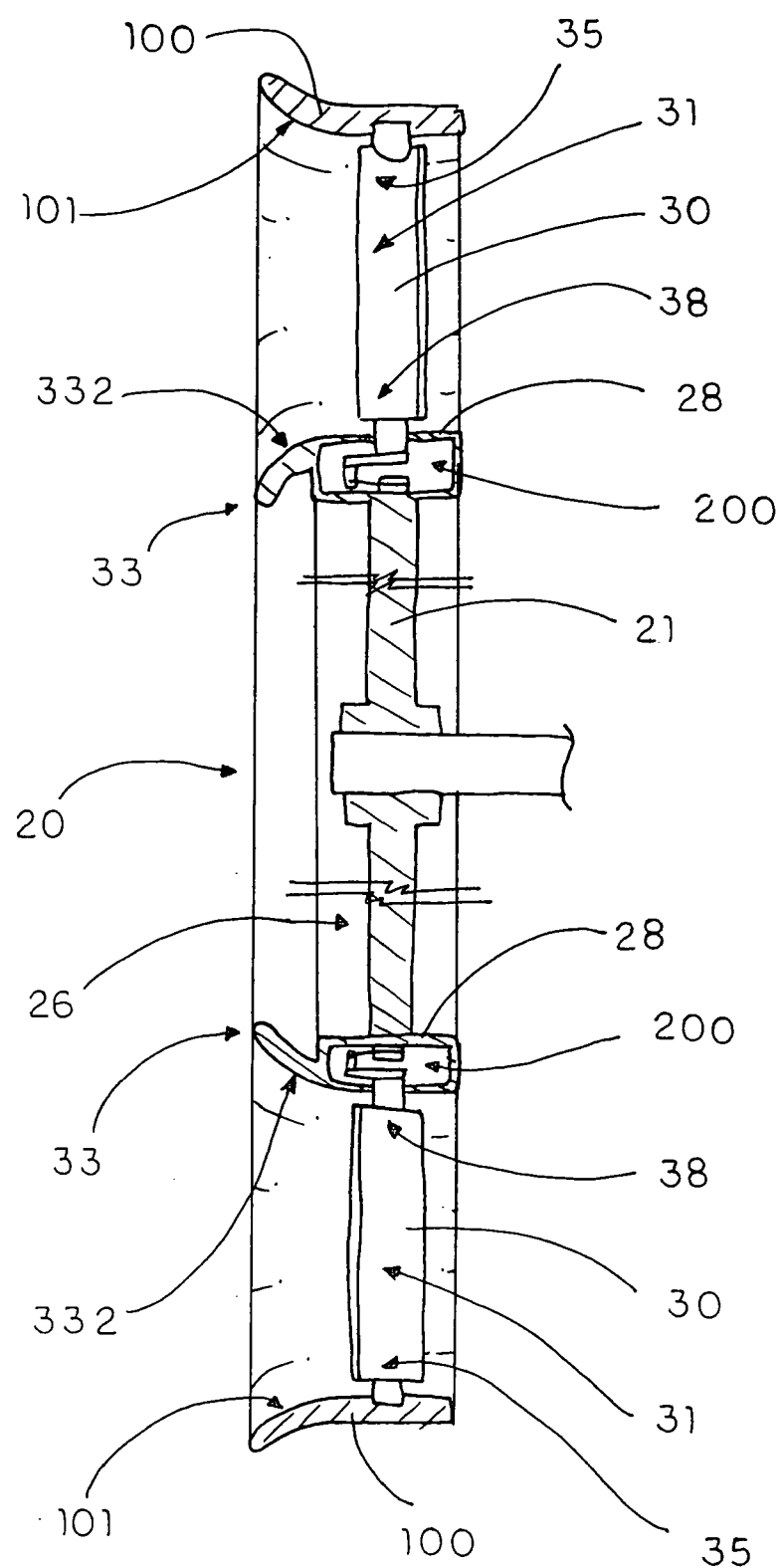
FIG. 13 is a sectional side view of the wind turbine according to the above preferred embodiment of the present invention.

In order to further describe the wind turbine of the present invention, referring to FIG. 12 and FIG. 13 of the drawings, the wind turbine is for a power generator, and comprises the rotor hub 20 and the plurality of blades 30.

The rotor hub 20 is adapted for rotatably coupling with the power generator to generate a rotation power thereto, wherein the rotor hub 20 has the peripheral guiding rim 28 and the passage 26 formed within the guiding rim 28 for allowing an axial flow of air passing through the passage 26 of the rotor hub 20.

The plurality of blades 30 is outwardly and spacedly extended from the guiding rim 28 of the rotor hub 20, wherein each of the blades 30 has a blade surface 31 arranged in such a manner that when the air flow exerts on the blade surfaces 31 of the blades 30, the rotor hub 20 is driven to rotate for generating the rotational power to the power generator, wherein the rotor hub 20 allows the air flow passing through the air passage 26 to minimize an air drag thereof so as to enhance an efficiency of the rotational power generated by the rotor hub 20.

According to the preferred embodiment of the present invention, the guiding rim 28 is shaped and sized to extend from the rotor hub 20 to the blade surfaces 31 of the blades 30 in such a manner that when the air passes through the rotor hub 20, it will be guided by the guiding rim 28 to travel therealong and when the air is has been guided to flow through the blade surfaces 31, it provides additional power for rotating the blades 30 so as to enhance an efficiency of the wind turbine in converting wind's kinetic energy to the rotational power of the wind turbine.

The rotor hub 20 further comprises an air guider 33 provided on the guiding rim 28 to form an air detouring surface 332 on the guiding rim 28 for guiding the air flowing towards the blade surface 31 of each of the blades 30 when the air flow impinges on the rotor hub 20 so as to provide additional wind power to the blade 30 for rotating the wind turbine.

Each of the blades 30 has the leading edge 36 that is curved for minimizing turbulence when the blade 30 slices into the flow of air, and a trailing edge 37 having a tapered contour 371 extending between the distal end 35 of the blade 30 to the proximal end 38 thereof, such that when the air hits on the blade 30, the blade is efficiently driven to rotate for converting an kinetic energy of the flow of air to the rotational power of the wind turbine.

The wind turbine may further comprise a plurality of hinges 32 connecting the rotor hub 20 with the proximal ends 38 of blades 30 respectively in a retractably rotating manner to allow a blade angle of each of the blades 30 to be adjustably changed with respect to a direction of the air flow, so as to regulate a rotational speed of the rotor hub 20.

Each of the hinges 32 comprises a first and a second pulley 72, 74 provided on the rotor hub 20 and a cable movably connecting the first and the second pulleys 72, 74 with the respective blade 30, in such a manner that the pulleys 72, 74 are rotated to adjust a tension of the cable 60 (62) for retractably adjusting a position and an angle of the respective blade 30 with respect to the rotor hub 20. It is worth mentioning that at least one pulley 72 (74) is sufficient to adjust an angle of the blade 30.

Figure 15:
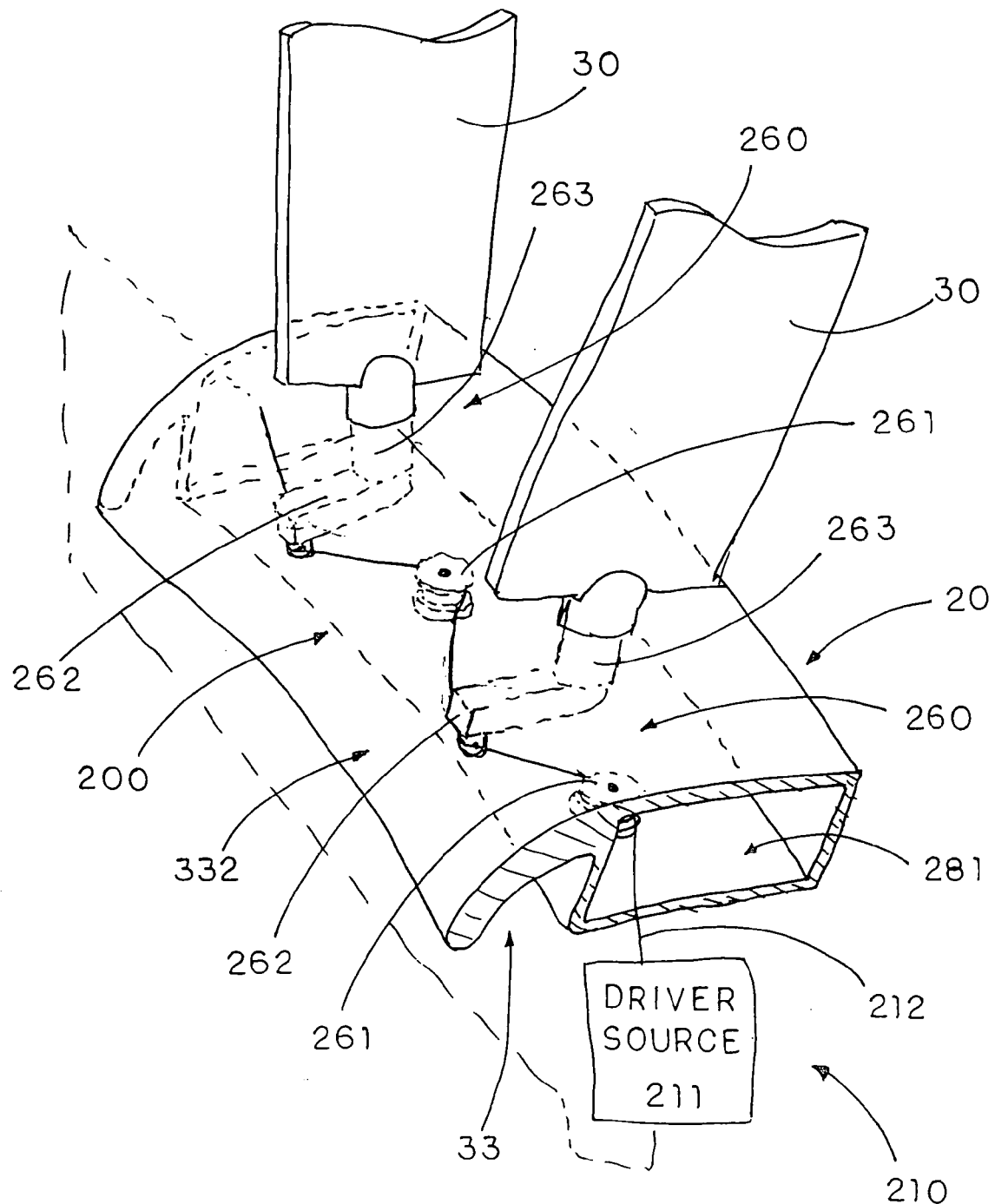
FIG. 15 is a perspective view of the angle adjusting arrangement according to the above preferred embodiment of the present invention.
Figure 16:
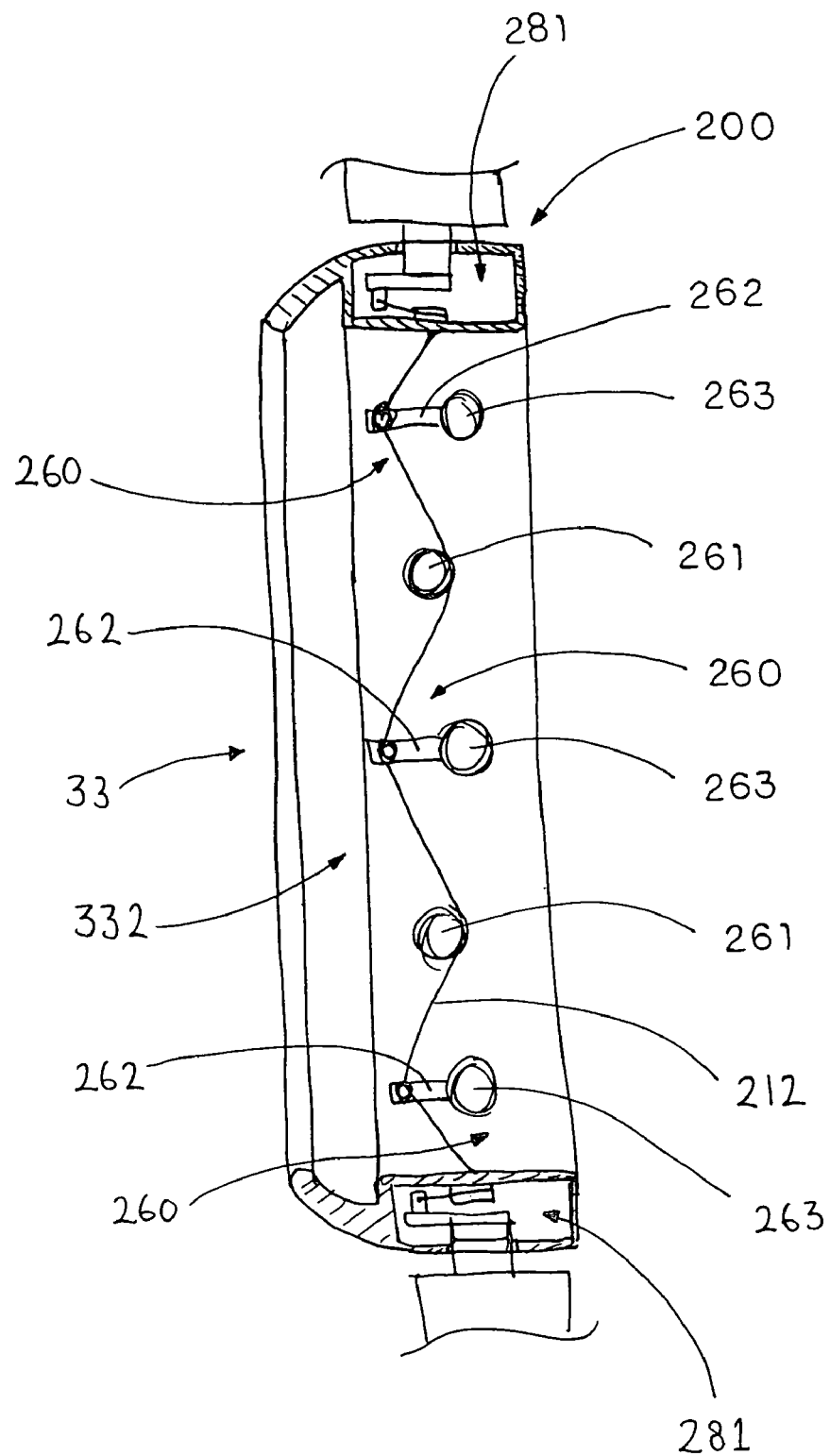
FIG. 16 is a schematic diagram of the angle adjusting arrangement according to the above preferred embodiment of the present invention.

Referring to FIG. 15 and FIG. 16 of the drawings, the wind turbine further comprise an angle adjusting arrangement 200 comprising a driving arrangement 210 and a plurality of adjustment mechanisms each of which connecting the respective blade 30 with the rotor hub 20 in a movably adjustable manner so as to adjust an angle of the respective blade 30. According to the preferred embodiment of the present invention, the driving arrangement 210 is operatively provided within the rotor hub 20, wherein the each of the adjustment mechanisms comprises a transmission assembly 260 connecting the driving arrangement 210 with the respective blade 30 in such a manner that when the driving arrangement 210 is driven to operate, it will drive the transmission assemblies 260 to operate as well for altering an angle of the blade 30.

More specifically, each of the driving arrangements 210 comprises a driver source 211 adapted for delivering a rotation power, and a driving cable 212 connected with the driver source 211 for transforming a rotational power to a predetermined amount of linear force.

Each of the transmission assemblies 260 comprises a driven pulley 261, a driven shaft 262, and a pivotal shaft 263 extended along a longitudinal direction of the respective blade 30 so as to allow the blade 30 to rotate about the pivotal shaft 263, wherein a bottom portion of the pivotal shaft 263 is connected with the driven shaft 262 which is then connected with the driven pulley 261 via the driving cable 212.

Moreover, the driver source 211 is preferably embodied as a motor assembly provided in the rotor hub 20 for connecting with the driving cable 212 so as to selectively and controllably drive the driving cable 212 to move in a predetermined direction.

Consequently, when the motor assembly is activated, the driving cable 212 is driven to move via all driven pulleys 261. Since the driving cable 212 is affixed to the driven shaft 262, when the driving cable 212 is driven to move, the driven shaft 262 is driven to move and the blade 30 is driven to pivotally move with respect to the rotor hub 20 for adjusting an angle thereof.

The wind turbine further comprises an outer retention frame 100 connecting to the distal ends 35 of the blades 30, wherein the outer retention frame 100 has an air guiding surface 101 extended towards the distal ends 35 of the blades 30 for guiding the air flowing towards the blade surface 31 of each of the blades 30 when the air flow impinges on the retention frame 100 so as to provide additional wind power to the blade 30 for rotating the wind turbine.

It is worth pointing out that the rotor hub 20 having a ring shape and defining the air passage 26 therewithin, comprises the plurality of spokes 21 spacedly extended from the guiding rim 28 to rotatably couple with the power generator.

Moreover, the angle adjusting arrangement 200 is received in the guiding rim 28 of the rotor hub 20 for adjusting the angle of the blades 30. Accordingly, the guiding rim 28 further has a storage cavity 281 formed therein for operatively receiving the angle adjusting arrangement 200.

Figure 14:
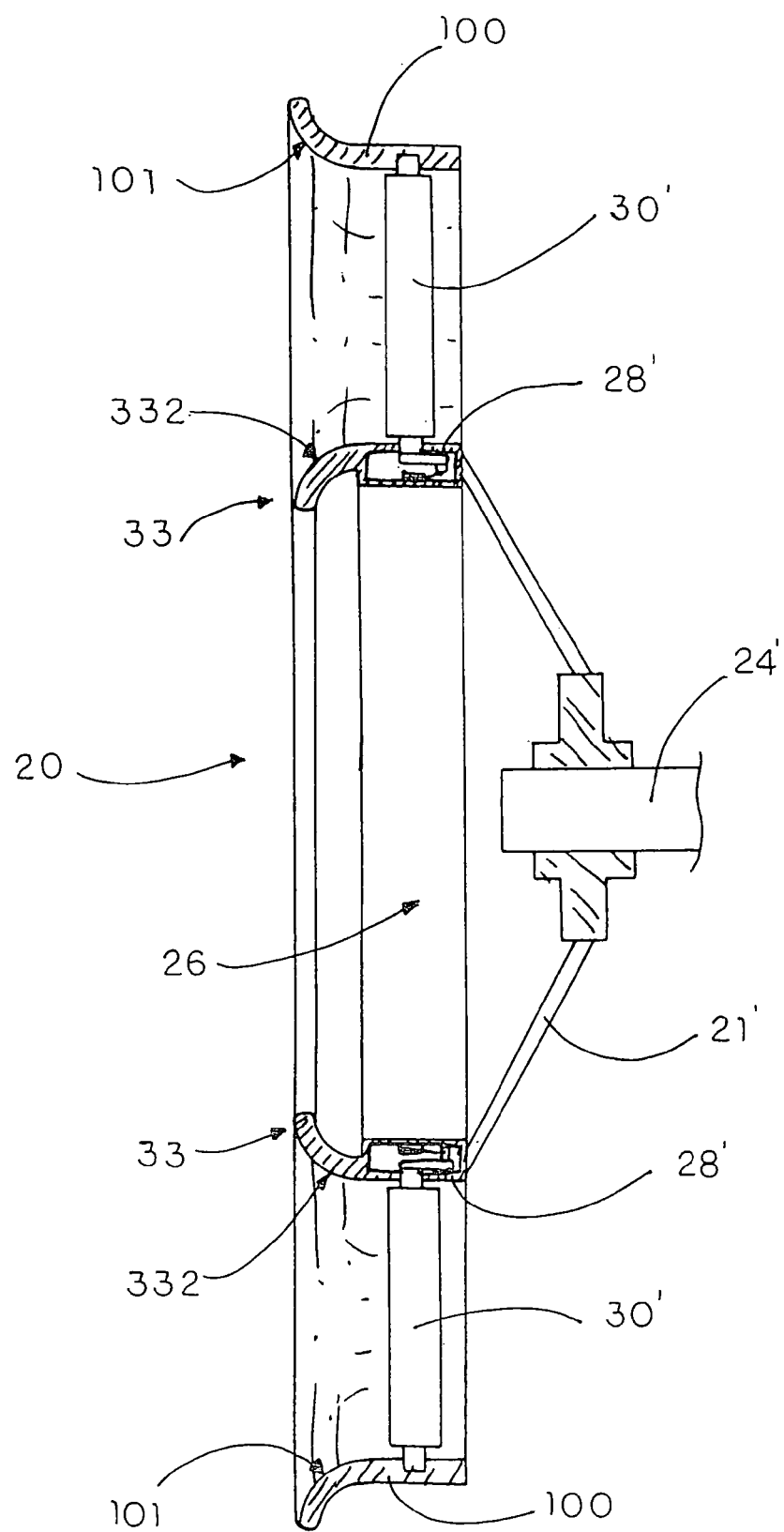
FIG. 14 is an alternative mode of the wind turbine according to the above preferred embodiment of the present invention.

Referring to FIG. 14 of the drawings, a first alternative mode of the wind turbine according to the above preferred embodiment of the present invention is illustrated. This alternative mode is similar to the preferred embodiment except the rotor hub 20'. According to the alternative mode, the rotor hub 20' comprises a guiding rim 28' from which the plurality of blades 30' are extended, a central rotating pivot 24' provided behind the guiding rim 28' for rotatably connecting with the power generator, and a plurality of spokes 21' rearwardly, spacedly and concentrically extended from the guiding rim 28' to connect with the central rotating pivot 24' in such a manner that when the blades 30' are subject to air flow, the blades 30' are adapted for being driven to rotate about the central rotating pivot 24' via rotational motions of the spokes 21' and the guiding rim 28'.

It is worth mentioning that the air passage 26' is formed in between each two spokes 21' so that air is capable of passing through the rotor hub 20' for minimizing the air drag inducing to the wind turbine.

Figure 17:
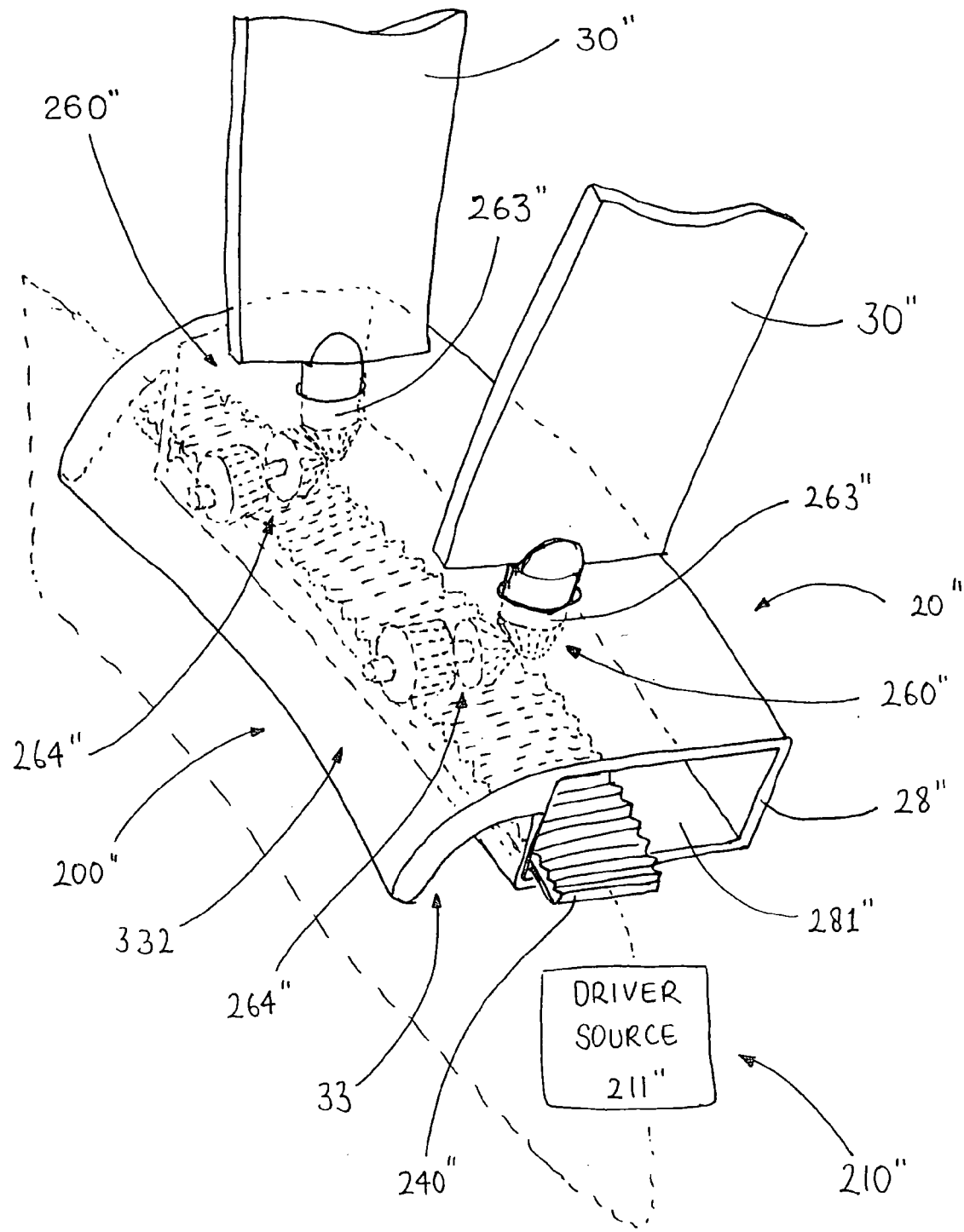
FIG. 17 is a second alternative mode of the angle adjusting arrangement according to the above preferred embodiment of the present invention.

Referring to FIG. 17 of the drawings, a second alternative mode of the wind turbine according to the above preferred embodiment of the present invention is illustrated. This alternative mode is similar to the preferred embodiment except the angle adjusting arrangement 200".

According to the second alternative mode, the angle adjusting arrangement 200" comprises a driving arrangement 210" and a plurality of adjustment mechanisms each of which connecting the respective blade 30" with the rotor hub 20" in a movably adjustable manner so as to adjust an angle of the respective blade 30". According to the preferred embodiment of the present invention, the driving arrangement 210" is operatively provided within the rotor hub 20", wherein each of the adjustment mechanisms comprises a transmission assembly 260" connecting the driving arrangement with the respective blade 30" in such a manner that when the driving arrangement is driven to operate, it will drive the transmission assembly 260" to operate as well for altering an angle of the blade 30".

The driving arrangements 210" comprises a driver source 211" adapted for delivering a rotational power, and a main transmission gear 240" connected with the driver source 211" for transforming a rotational power to a predetermined amount of linear force.

The main transmission gear 240" is rotatably received in the rotor hub 20". The transmission assembly 260" comprises a pivotal shaft 263" pivotally connecting the respective blade 30" with the rotor hub 20", and a gear assembly 264" operatively coupling the lower end of the pivotal shaft 263" with the transmission gear 240" in such a manner that when the transmission gear 240" is driven to rotate, the gear assembly 264" is driven to operate so as to rotate the blade 30" for changing the angle thereof.

Moreover, the angle adjusting arrangement 200" is received in the guiding rim 28" of the rotor hub 20" for adjusting the angle of the blades 30". Accordingly, the guiding rim 28" further has a storage cavity 281" formed therein for operatively receiving the angle adjusting arrangement 200".

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wind turbine for a power generator, comprising:

a rotor hub adapted for rotatably coupling with said power generator to generate a rotation power thereto, wherein said rotor hub has a peripheral guiding rim and an air passage formed within said guiding rim for allowing an axial flow of air passing through said air passage of said rotor hub; and a plurality of blades, each of said blades having a proximal end radially extended from said guiding rim of said rotor rub and a distal end outwardly extending to define a blade surface between said proximal end and said distal end, wherein said surfaces of said blades are arranged in such a manner that when said air flow exerts on said blade surfaces of said blades, said rotor hub is driven to rotate for generating said rotational power to said power generator, wherein said rotor hub allows said air flow passing through said air passage to minimize an air drag thereof so as to enhance an efficiency of said rotational power generated by said rotor hub.

2. The wind turbine, as recited in claim 1, wherein said rotor hub further comprises an air guider provided on said guiding rim to form an air detouring surface on said guiding rim for guiding said air flowing towards said blade surface of each of said blades when said air flow impinges on said rotor hub so as to provide additional wind power to said blade for rotating said wind turbine.

3. The wind turbine, as recited in claim 1, wherein each of said blades has a leading edge that is curved for minimizing turbulence when said blade slices into said flow of air, and a trailing edge having a tapered contour extending between said distal end of said blade to said proximal end thereof, such that when said air hits on said blade, said blade is efficiently driven to rotate for converting an kinetic energy of said flow of air to said rotational power of said wind turbine.

4. The wind turbine, as recited in claim 2, wherein each of said blades has a leading edge that is curved for minimizing turbulence when said blade slices into said flow of air, and a trailing edge having a tapered contour extending between said distal end of said blade to said proximal end thereof, such that when said air hits on said blade, said blade is efficiently driven to rotate for converting an kinetic energy of said flow of air to said rotational power of said wind turbine.

5. The wind turbine, as recited in claim 1, further comprises a plurality of hinges connecting said rotor hub with said proximal ends of blades respectively in a retractably rotating manner to allow a blade angle of each of said blades to be adjustably changed with respect to a direction of said air flow, so as to regulate a rotational speed of said rotor hub.

6. The wind turbine, as recited in claim 2, further comprises a plurality of hinges connecting said rotor hub with said proximal ends of blades respectively in a retractably rotating manner to allow a blade angle of each of said blades to be adjustably changed with respect to a direction of said air flow, so as to regulate a rotational speed of said rotor hub.

7. The wind turbine, as recited in claim 4, further comprises a plurality of hinges connecting said rotor hub with said proximal ends of blades respectively in a retractably rotating manner to allow a blade angle of each of said blades to be adjustably changed with respect to a direction of said air flow, so as to regulate a rotational speed of said rotor hub.

8. The wind turbine, as recited in claim 1, further comprising an angle adjusting arrangement which comprises a driving arrangement and a plurality of adjustment mechanisms each of which connecting said respective blade with said rotor hub in a movably adjustable manner, wherein each of said adjustment mechanisms comprises a transmission assembly coupling said driving arrangement with said respective blade in such a manner that when said driving arrangement is driven to operate, said transmission assembly is driven to operate for altering an angle of said corresponding blade.

9. The wind turbine, as recited in claim 2, further comprising an angle adjusting arrangement which comprises a driving arrangement and a plurality of adjustment mechanisms each of which connecting said respective blade with said rotor hub in a movably adjustable manner, wherein each of said adjustment mechanisms comprises a transmission assembly coupling said driving arrangement with said respective blade in such a manner that when said driving arrangement is driven to operate, said transmission assembly is driven to operate for altering an angle of said corresponding blade.

10. The wind turbine, as recited in claim 4, further comprising an angle adjusting arrangement which comprises a driving arrangement and a plurality of adjustment mechanisms each of which connecting said respective blade with said rotor hub in a movably adjustable manner, wherein each of said adjustment mechanisms comprises a transmission assembly coupling said driving arrangement with said respective blade in such a manner that when said driving arrangement is driven to operate, said transmission assembly is driven to operate for altering an angle of said corresponding blade.

11. The wind turbine, as recited in claim 8, wherein each of said driving arrangements comprises a driver source adapted for delivering a rotational power, and a driving cable connected with said driver source for transforming a rotational power to a predetermined amount of linear force, wherein each of said transmission assemblies comprises a driven pulley, a driven shaft, and a pivotal shaft extended along a longitudinal direction of said respective blade so as to allow said blade to rotate about said pivotal shaft, wherein a bottom portion of said pivotal shaft is connected with said driven shaft which is then connected with said driven pulley via said driving cable, so that when said driving source is activated, said driving cable is driven to move for driving said driven shaft to move so as to drive said blade to move pivotally with respect to said rotor hub.

12. The wind turbine, as recited in claim 9, wherein each of said driving arrangements comprises a driver source adapted for delivering a rotational power, and a driving cable connected with said driver source for transforming a rotational power to a predetermined amount of linear force, wherein each of said transmission assemblies comprises a driven pulley, a driven shaft, and a pivotal shaft extended along a longitudinal direction of said respective blade so as to allow said blade to rotate about said pivotal shaft, wherein a bottom portion of said pivotal shaft is connected with said driven shaft which is then connected with said driven pulley via said driving cable, so that when said driving source is activated, said driving cable is driven to move for driving said driven shaft to move so as to drive said blade to move pivotally with respect to said rotor hub.

13. The wind turbine, as recited in claim 10, wherein each of said driving arrangements comprises a driver source adapted for delivering a rotational power, and a driving cable connected with said driver source for transforming a rotational power to a predetermined amount of linear force, wherein each of said transmission assemblies comprises a driven pulley, a driven shaft, and a pivotal shaft extended along a longitudinal direction of said respective blade so as to allow said blade to rotate about said pivotal shaft, wherein a bottom portion of said pivotal shaft is connected with said driven shaft which is then connected with said driven pulley via said driving cable, so that when said driving source is activated, said driving cable is driven to move for driving said driven shaft to move so as to drive said blade to move pivotally with respect to said rotor hub.

14. The wind turbine, as recited in claim 8, wherein each of said driving arrangements comprises a driver source adapted for delivering a rotational power, and a main transmission gear connected with said driver source for transforming a rotational power to a predetermined amount of linear force, wherein said transmission assemblies comprises a pivotal shaft pivotally connecting the respective blade with said rotor hub, and a gear assembly operatively coupling said lower end of said pivotal shaft with said transmission gear in such a manner that when said transmission gear is driven to rotate, said gear assembly is driven to operate so as to rotate said blade for changing said angle thereof.

15. The wind turbine, as recited in claim 9, wherein each of said driving arrangements comprises a driver source adapted for delivering a rotational power, and a main transmission gear connected with said driver source for transforming a rotational power to a predetermined amount of linear force, wherein said transmission assemblies comprises a pivotal shaft pivotally connecting the respective blade with said rotor hub, and a gear assembly operatively coupling said lower end of said pivotal shaft with said transmission gear in such a manner that when said transmission gear is driven to rotate, said gear assembly is driven to operate so as to rotate said blade for changing said angle thereof.

16. The wind turbine, as recited in claim 10, wherein each of said driving arrangements comprises a driver source adapted for delivering a rotational power, and a main transmission gear connected with said driver source for transforming a rotational power to a predetermined amount of linear force, wherein said transmission assemblies comprises a pivotal shaft pivotally connecting the respective blade with said rotor hub, and a gear assembly operatively coupling said lower end of said pivotal shaft with said transmission gear in such a manner that when said transmission gear is driven to rotate, said gear assembly is driven to operate so as to rotate said blade for changing said angle thereof.

17. The wind turbine, as recited in claim 1, further comprising an outer retention frame connecting to said distal ends of said blades, wherein said outer retention frame has an air guiding surface extended towards said distal ends of said blades for guiding said air flowing towards said blade surface of each of said blades when said air flow impinges on said retention frame so as to provide additional wind power to said blade for rotating said wind turbine.

18. The wind turbine, as recited in claim 13, further comprising an outer retention frame connecting to said distal ends of said blades, wherein said outer retention frame has an air guiding surface extended towards said distal ends of said blades for guiding said air flowing towards said blade surface of each of said blades when said air flow impinges on said retention frame so as to provide additional wind power to said blade for rotating said wind turbine.

19. The wind turbine, as recited in claim 16, further comprising an outer retention frame connecting to said distal ends of said blades, wherein said outer retention frame has an air guiding surface extended towards said distal ends of said blades for guiding said air flowing towards said blade surface of each of said blades when said air flow impinges on said retention frame so as to provide additional wind power to said blade for rotating said wind turbine.

20. The wind turbine, as recited in claim 1, wherein said rotor hub, having a ring shape and defining said air passage therewithin, comprises a plurality of spokes spacedly extended from said guiding rim to rotatably couple with said power generator.

21. The wind turbine, as recited in claim 18, wherein said rotor hub, having a ring shape and defining said air passage therewithin, comprises a plurality of spokes spacedly extended from said guiding rim to rotatably couple with said power generator.

22. The wind turbine, as recited in claim 19, wherein said rotor hub, having a ring shape and defining said air passage therewithin, comprises a plurality of spokes spacedly extended from said guiding rim to rotatably couple with said power generator.

23. The wind turbine, as recited in claim 20, wherein said rotor hub further comprises a central rotating pivot rotatably coupling with said power generator, wherein said spokes are rearwardly and concentrically extended from said guiding rim to said central rotating pivot in such a manner that when said blades expose to air flow, said blades are driven to rotate about said central rotating pivot.

24. The wind turbine, as recited in claim 21, wherein said rotor hub further comprises a central rotating pivot rotatably coupling with said power generator, wherein said spokes are rearwardly and concentrically extended from said guiding rim to said central rotating pivot in such a manner that when said blades expose to air flow, said blades are driven to rotate about said central rotating pivot.

25. The wind turbine, as recited in claim 22, wherein said rotor hub further comprises a central rotating pivot rotatably coupling with said power generator, wherein said spokes are rearwardly and concentrically extended from said guiding rim to said central rotating pivot in such a manner that when said blades expose to air flow, said blades are driven to rotate about said central rotating pivot.

* * * * *